US011086565B2

(12) United States Patent
Sallese et al.

(10) Patent No.: US 11,086,565 B2
(45) Date of Patent: Aug. 10, 2021

(54) REDUCING EFFECTS OF READ ARRAY OPERATIONS OF READ APPARENT VOLTAGE

(71) Applicant: International Business Machines Corporation, Armonk, NY (US)

(72) Inventors: Kevin E. Sallese, Plainfield, IL (US); Timothy J. Fisher, Cypress, TX (US); Adalberto G. Yanes, Rochester, MN (US); Jason Szecheong Ma, Sugar Land, TX (US); Charles A. Keller, Houston, TX (US); Aaron D. Fry, Richmond, TX (US); Van Huynh, Houston, TX (US); Nikolaos Papandreou, Thalwil (CH)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/148,924

(22) Filed: Oct. 1, 2018

(65) Prior Publication Data
US 2020/0104071 A1    Apr. 2, 2020

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0679* (2013.01)

(58) Field of Classification Search
CPC ...... G06F 3/0659; G06F 3/0604; G06F 3/064; G06F 3/0679
See application file for complete search history.

(56) References Cited

U.S. PATENT DOCUMENTS

| 7,394,694 | B2 | 7/2008 | Micheloni et al. | |
| 8,923,045 | B2 | 12/2014 | Goss et al. | |
| 8,995,183 | B2 | 3/2015 | Shepard et al. | |
| 9,183,940 | B2 | 11/2015 | Lee | |
| 9,208,018 | B1* | 12/2015 | Northcott | G06F 11/1008 |
| 9,373,409 | B2 | 6/2016 | Chang et al. | |
| 2003/0182502 | A1* | 9/2003 | Kleiman | G06F 3/0689 |
| | | | | 711/114 |
| 2006/0010169 | A1* | 1/2006 | Kitamura | G06F 3/0685 |

(Continued)

OTHER PUBLICATIONS

Cai et al., "Error Patterns in MLC NAND Fash Memory: Measurement, Characterization, and Analysis," Proceedings of the Conference on Design, Automation and Test in Europe, 2012, pp. 1-6.

(Continued)

*Primary Examiner* — Nanci N Wong
(74) *Attorney, Agent, or Firm* — Zilka-Kotab, P.C.

(57) ABSTRACT

A computer-implemented method, according to one embodiment, includes: receiving a stream of data, and selecting more than one block of memory to write the stream of data to. The selected blocks of memory are in a memory that includes a plurality of blocks. Moreover, the data is written across the selected blocks of memory in parallel. The blocks of memory are also selected such that no two or more of the selected blocks of memory have an effect on a read apparent voltage of a same one of the plurality of blocks in the memory. Other systems, methods, and computer program products are described in additional embodiments.

20 Claims, 9 Drawing Sheets

(56) References Cited

U.S. PATENT DOCUMENTS

| | | |
|---|---|---|
| 2006/0285387 A1 | 12/2006 | Micheloni et al. |
| 2010/0265764 A1* | 10/2010 | Yoo .................... G11C 11/5642 |
| | | 365/185.02 |
| 2013/0279248 A1 | 10/2013 | Shepard et al. |
| 2013/0322169 A1 | 12/2013 | Goss et al. |
| 2015/0154061 A1* | 6/2015 | Camp .................. G06F 3/0688 |
| | | 714/6.13 |
| 2015/0363264 A1* | 12/2015 | Cai ..................... G11C 29/028 |
| | | 714/6.11 |
| 2017/0062045 A1 | 3/2017 | Wilson |
| 2017/0076807 A1 | 3/2017 | Asami et al. |

OTHER PUBLICATIONS

Cai et al., "Flash Correct-and-Refresh: Retention-Aware Error Management for Increased Flash Memory Lifetime," Computer Design (ICCD), 2012 IEEE 30th International Conference, pp. 1-10.

Papandreou et al., "Using Adaptive Read Voltage Thresholds to Enhance the Reliability of MLC NAND Flash Memory Systems," Proceedings of the 24th edition of the great lakes symposium on VLSI, 2014, pp. 1-6.

Dong et al., "Using Data Postcompensation and Predistortion to Tolerate Cell-to-Cell Interference in MLC NAND Flash Memory," IEEE Transactions on Circuits and Systems I: Regular Papers, vol. 57, No. 10, 2010, pp. 2718-2728.

\* cited by examiner

REDUCING EFFECTS OF READ ARRAY OPERATIONS OF READ APPARENT VOLTAGE

BACKGROUND

The present invention relates to data storage systems, and more particularly, this invention relates to managing read array operations in non-volatile memory to reduce impact on read apparent voltages.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is typically 256 pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT).

As Flash-based memory cells exhibit read errors and/or failures due to wear or other reasons, additional redundancy may be used within memory pages as well as across memory chips (e.g., RAID-5 and RAID-6 like schemes). The additional redundancy within memory pages may include error correction code (ECC) which, for example, may include BCH codes. While the addition of ECC in pages is relatively straightforward, the organization of memory blocks into RAID-like stripes is more complex. For instance, individual blocks are retired over time which requires either reorganization of the stripes, or capacity reduction of the stripe. As the organization of stripes together with the LPT defines the placement of data, SSDs typically utilize a Log-Structured Array (LSA) architecture, which combines these two methods.

The LSA architecture relies on out-of-place writes. In this approach, a memory page overwrite will result in writing the memory page data to a new location in memory, marking the old copy of the memory page data as invalid, and then updating the mapping information. Due to the limitations of current NAND memory technology, an invalidated data location cannot be reused until the entire block it belongs to has been erased. Before erasing, though, the block undergoes garbage collection, whereby any valid data in the block is relocated to a new block. Garbage collection of a block is typically deferred for as long as possible to maximize the amount of invalidated data in block, and thus reduce the number of valid pages that are relocated, as relocating data causes additional write operations, and thereby increases write amplification.

SUMMARY

A computer-implemented method, according to one embodiment, includes: receiving a stream of data, and selecting more than one block of memory to write the stream of data to. The selected blocks of memory are in a memory that includes a plurality of blocks. Moreover, the data is written across the selected blocks of memory in parallel. The blocks of memory are also selected such that no two or more of the selected blocks of memory have an effect on a read apparent voltage of a same one of the plurality of blocks in the memory.

A computer program product, according to another embodiment, includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a stream of data; selecting, by the processor, more than one block of memory to write the stream of data to; and writing, by the processor, the data across the selected blocks of memory in parallel. The selected blocks of memory are in a memory that includes a plurality of blocks. Moreover, the blocks of memory are selected such that no two or more of the selected blocks of memory have an effect on a read apparent voltage of a same one of the plurality of blocks in the memory.

A system, according to yet another embodiment, includes: a plurality of non-volatile random access memory blocks configured to store data, a processor; and logic integrated with and/or executable by the processor. The logic is configured to: receive, by the processor, a stream of data; select, by the processor, more than one block of memory to write the stream of data to; and write, by the processor, the data across the selected blocks of memory in parallel. The selected blocks of memory are in a memory that includes a plurality of blocks. Moreover, the blocks of memory are selected such that no two or more of the selected blocks of memory have an effect on a read apparent voltage of a same one of the plurality of blocks in the memory.

Other aspects and embodiments of the present invention will become apparent from the following detailed description, which, when taken in conjunction with the drawings, illustrate by way of example the principles of the invention.

DETAILED DESCRIPTION

Figure 1:
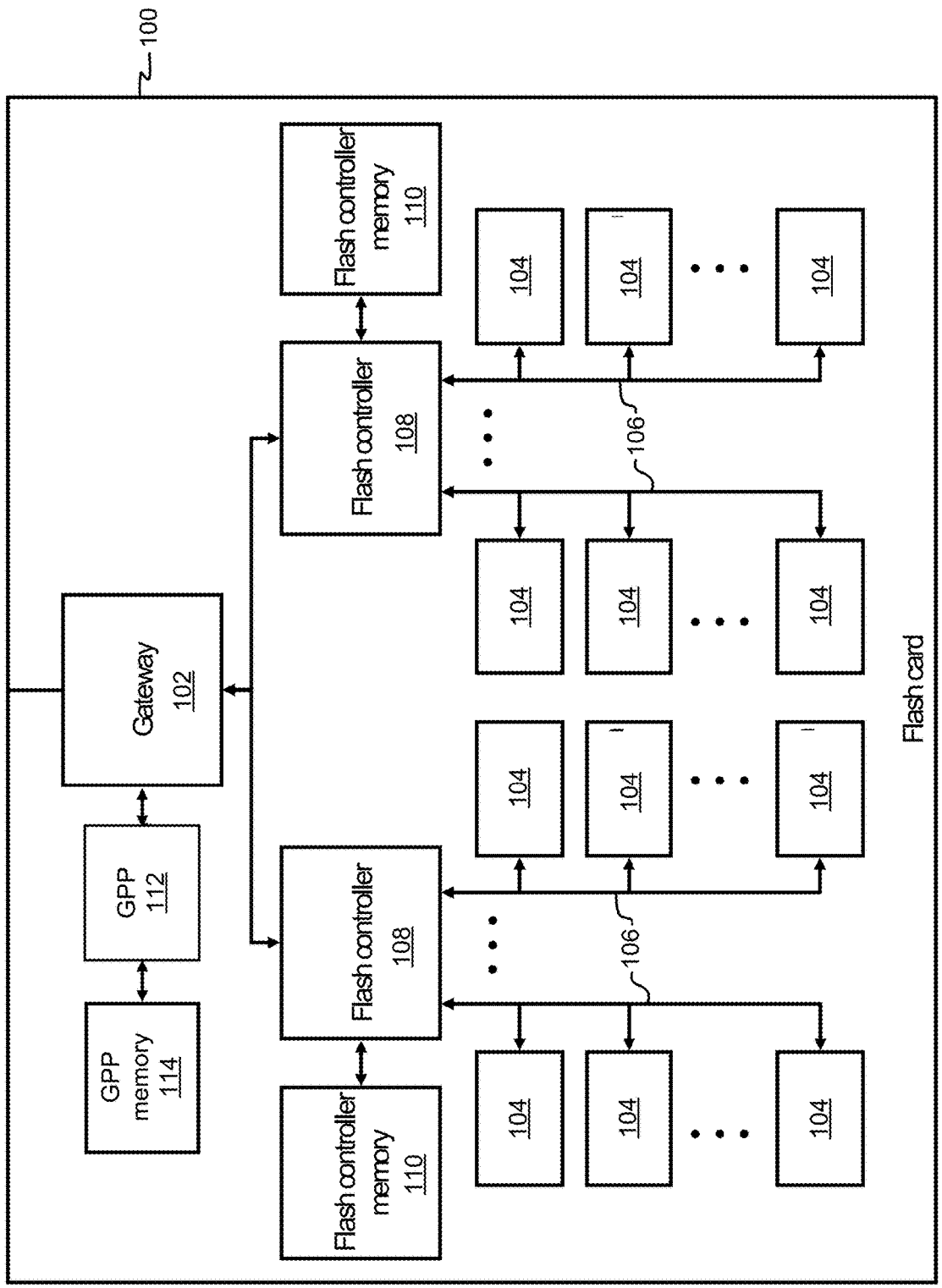
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example non-volatile random access memory (NVRAM) technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: receiving a stream of data, and selecting more than one block of memory to write the stream of data to. The selected blocks of memory are in a memory that includes a plurality of blocks. Moreover, the data is written across the selected blocks of memory in parallel. The blocks of memory are also selected such that no two or more of the selected blocks of memory have an effect on a read apparent voltage of a same one of the plurality of blocks in the memory.

In another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: receiving, by the processor, a stream of data; selecting, by the processor, more than one block of memory to write the stream of data to; and writing, by the processor, the data across the selected blocks of memory in parallel. The selected blocks of memory are in a memory that includes a plurality of blocks. Moreover, the blocks of memory are selected such that no two or more of the selected blocks of memory have an effect on a read apparent voltage of a same one of the plurality of blocks in the memory.

In yet another general embodiment, a system includes: a plurality of non-volatile random access memory blocks configured to store data, a processor; and logic integrated with and/or executable by the processor. The logic is configured to: receive, by the processor, a stream of data; select, by the processor, more than one block of memory to write the stream of data to; and write, by the processor, the data across the selected blocks of memory in parallel. The selected blocks of memory are in a memory that includes a plurality of blocks. Moreover, the blocks of memory are selected such that no two or more of the selected blocks of memory have an effect on a read apparent voltage of a same one of the plurality of blocks in the memory.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
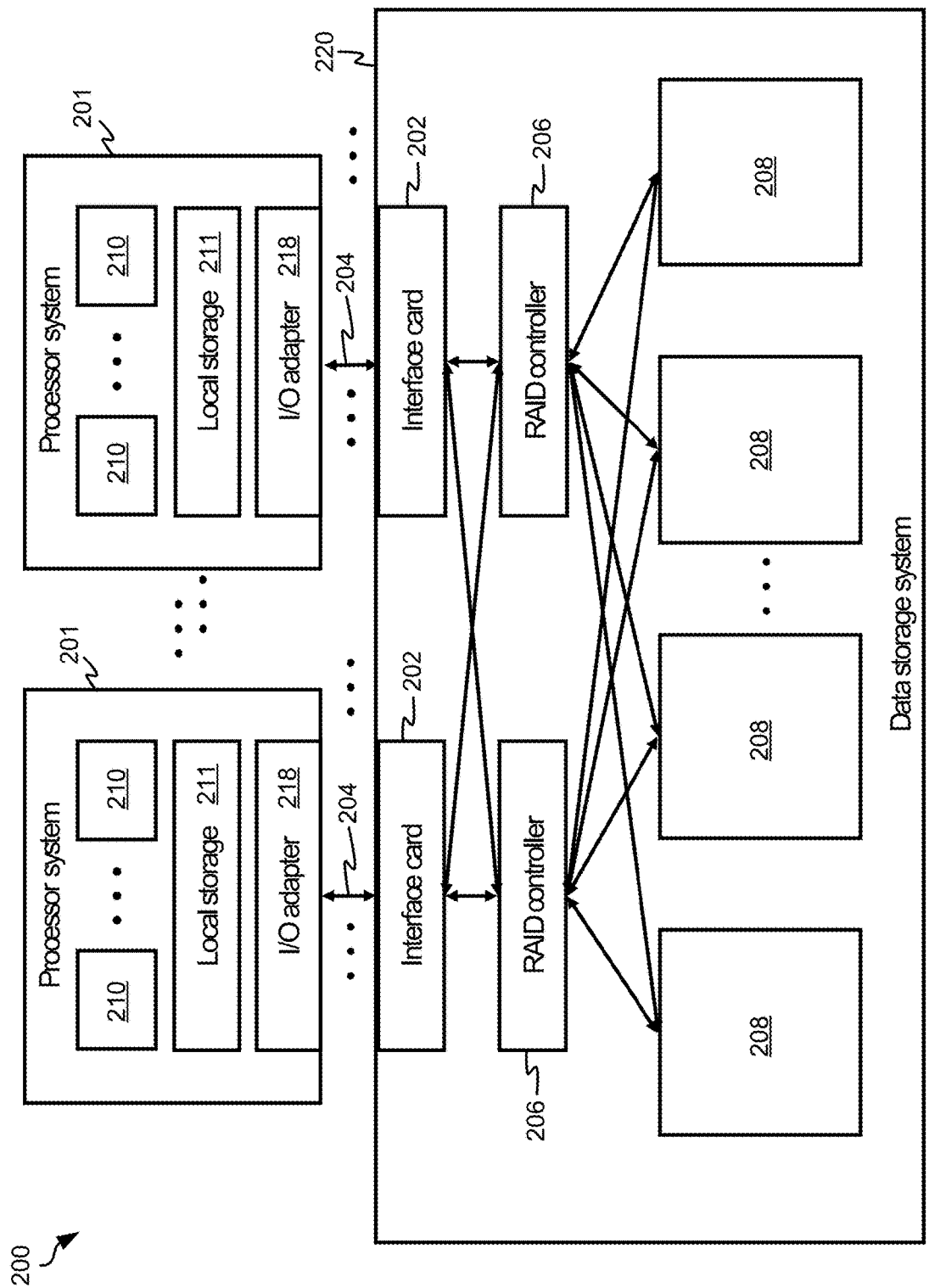
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 814 of FIG. 8, ROM 816 of FIG. 8, etc.), and an I/O adapter 218 configured to communicate with the data storage system 220.

Referring again to FIG. 1, memory controllers 108 and/or other controllers described herein (e.g., RAID controllers 206 of FIG. 2) may be able to perform various functions on stored data, depending on the desired embodiment. Specifically, memory controllers may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat segregation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore, the write amplification incurred by performing garbage collection is much lower for embodiments implementing heat segregation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Figure 3:
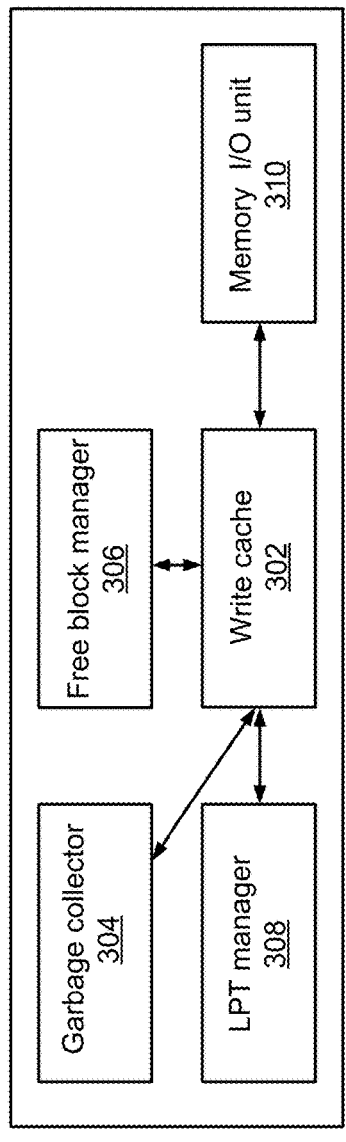
FIG. 3 is a system diagram, in accordance with one embodiment.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB logical addresses. The memory I/O unit 310 communicates with the memory chips in order to perform low level operations, e.g., such as reading one or more non-volatile memory pages, writing a non-volatile memory page, erasing a non-volatile memory block, etc.

Figure 4:
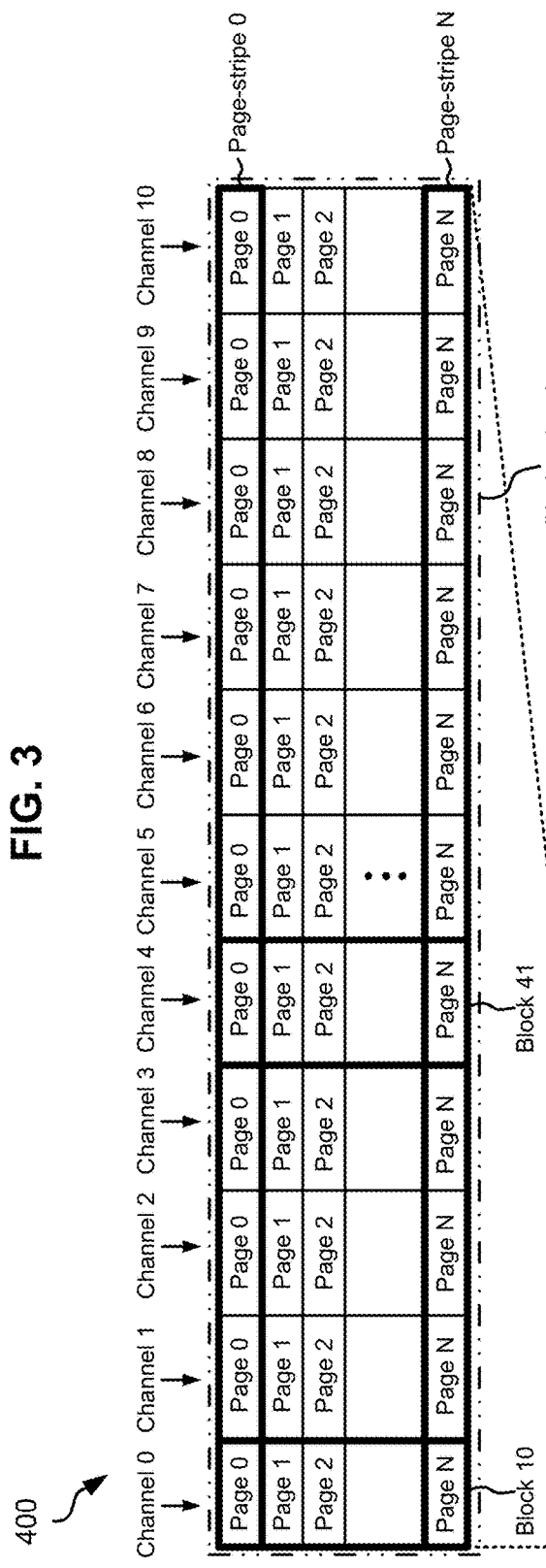
FIG. 4 is a conceptual diagram which includes a block-stripe and page-stripe, in accordance with one embodiment.
Figure 4:
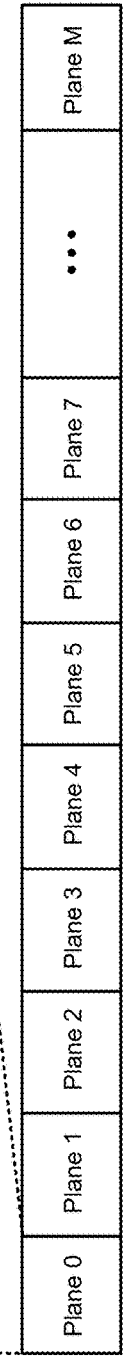

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or less in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

Data stored in non-volatile memory such as NAND Flash memory is read by applying a specific voltage to the respective physical cells storing the bits of data. Read apparent voltage (RAV) is an anomaly found in, but not limited to, 3D triple level cell (TLC) NANO Flash, which can affect the ability to properly read back data stored in a NANO flash cell. While this anomaly is not well understood, it has been determined through extensive testing that something is causing the apparent threshold voltage for given cells to not reflect the voltage that is actually stored in the respective cells. This in turn can cause an incorrect determination of what data is stored in the cell, which may not even be overcome using a strong ECC.

To describe RAV two exemplary states, which are in no way intended to limit the invention, will be used to represent the best and worst case scenarios for reading data stored in non-volatile memory. The "worst case" scenario involves a "bad" state in which the apparent voltage on a given cell is significantly different than the actual voltage stored in the cell, this difference being to the point that the data cannot be read back correctly. The "best case" scenario involves a "good" state in which the apparent voltage is equal to the actual voltage stored in the cell, which results in the best chance of reading back the correct data.

It follows that RAV creates the potential for a higher read bit error rate (RBER) when any page in a given block of memory is read according to the "worst case" scenario. NAND storage cells in the array are known to fluctuate between these worst and best case scenarios. Accordingly, the state of a given cell in memory depends on array operations, time, temperature, etc.

Program verify operations performed during memory cell programming ensure the cells are at least programmed in a state which falls in the best case scenario. However, over time the cells drift towards a state more aligned with the worst case scenario, where a higher RBER is experienced which introduces the potential of exceeding the correction strength of ECC algorithms. The amount of time it takes for a cell to transition from a best case scenario to a worst case scenario varies, but may be accelerated dramatically by temperature and/or other array operations, e.g., such as block erase, read array, etc. The rate of degradation corresponds, at least in part, to the number and/or type of array operations and placement operations performed in time relative to the natural time-based shift between these states. For instance, each block erase or read array command incrementally accelerate the pace of the transition of affected blocks towards an undesirable state.

The initial read of a page in a given block, regardless of whether the block is in a "good" or "bad" state, transitions all the cells/pages in that block to the "good" state. To date, the only known "RAV Mitigation" (RAVM) technique is to periodically Read a single page of all programmed blocks in an attempt to keep all of the cells in a block perpetually in a "good" state.

While the first read of a page of a given block returns the entire block to the good state regardless of the block's current state, the challenge for developers is to find a way to ensure that when a page is read, the block in question is already in a good state so that the additionally latency involved with performing a second read operation is not incurred. Accordingly, improvements which increase the likelihood of experiencing a successful read operation for each read operation attempted is desired.

Furthermore, while the initial read of a page in a given block transitions all the cells/pages in that block to the "good" state, recent testing has confirmed that this first-line of defense RAVM strategy is insufficient when considering the accelerating effects of various array operations on the time it takes to transition from a good state to a bad one. It has been found that with certain workloads, some blocks in a given die can be read very quickly over and over again while other blocks in the same die are read more slowly, periodically, and with a greater amount of time therebetween.

The inventors have also discovered that blocks in a die are "related" in that they have an aggressor-victim relationship to each other regarding read array operations. For example, while reading page x in block y repeatedly keeps all cells in block y in a good state, it adversely affects the cells of page x' in block y', dramatically accelerating the degradation process for pages in those blocks to enter a bad state, thereby calling for a read to be performed to repair the status thereof. Accordingly, the process of reading data from a page in memory cannot simply rely on performing an initial read of the page in addition to the actual read operation, as doing so would not only significantly increase read latency, but would also have a negative effect on one or more other pages in memory which have a victim-aggressor relationship with the block being read.

In sharp contrast to the aforementioned shortcomings experienced in conventional products and processes, various ones of the embodiments included herein are able to apply the knowledge of the aggressor-victim relationship which exists between block and/or pages of memory in order to architect a storage system which stripes sequential system addresses across blocks of memory rather than through them. In doing so, when a given workload reads a set of sequential addresses in a tight loop, the effects caused by the aggressor-victim relationships are spread evenly across a larger number of unique blocks and/or planes in a die and/or plane group. This is particularly desirable when compared to the concentrated effects that conventional processes have on a single block and/or page relationship, thereby driving the number of aggressor read operations to a critical level. It follows that some of the embodiments included herein are able to produce a storage architecture which limits (to the extent possible) the number of read array operations performed on a single block in memory to support a series of sequential read operations, e.g., as will be described in further detail below.

Figure 5A:
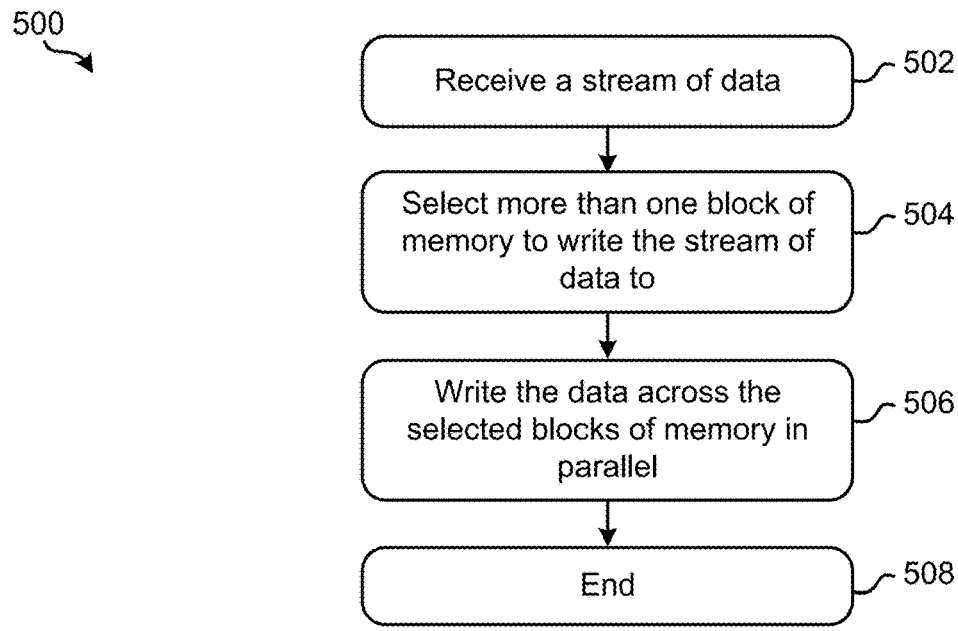
FIG. 5A is a flowchart of a method, in accordance with one embodiment.

Looking now to FIG. 5A, a flowchart of a method 500 is shown according to one embodiment. The method 500 may be performed in accordance with the present invention in any of the environments depicted in FIGS. 1-4, among others, in various embodiments. Of course, more or less operations than those specifically described in FIG. 5A may be included in method 500, as would be understood by one of skill in the art upon reading the present descriptions.

Each of the steps of the method 500 may be performed by any suitable component of the operating environment. For example, in various embodiments, the method 500 may be partially or entirely performed by a controller, a processor, a computer, etc., or some other device having one or more processors therein. Thus, in some embodiments, method 500 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5A, operation 502 of method 500 includes receiving a stream of data. Depending on the approach, the data stream may be received from a server running an application, directly from a user, from another storage location (e.g., as part of a data duplication procedure), etc. It follows that the amount of data received in the stream also varies depending on the approach. For instance, the total amount of data received, the rate at which data is received in a given amount of time, the consistency of the rate at which the data is received, etc. varies depending on the approach.

Operation 504 includes selecting more than one block of memory to write the stream of data to. The blocks of memory which are selected are included in memory which includes a plurality of blocks. For example, the blocks of memory selected in operation 504 are selected from a plurality of planes and/or layers in TLC NAND Flash memory in some approaches. The blocks of memory which are available for selection (e.g., do not have any data stored therein and/or are marked for garbage collection) are listed in a pool of available blocks in some approaches. Accordingly, operation 504 is performed in some situations by selecting a desired number of blocks of memory (e.g., based at least in part on an amount of data received in the stream) from a pool of available blocks.

In order to avoid situations where the selected blocks have a combined storage capacity which is smaller than a total amount of data received in the data stream, the number of blocks of memory which are actually selected in operation 504 is based on a total amount of data which is included in the stream of data. However, in some approaches the blocks of memory are selected while data is still being received in the data stream. Accordingly, the total amount of data received by the data stream may be predicted based on a current throughput of the data stream, an average throughput of the data stream, metadata received along with the data which describes the overarching write request, etc.

In some approaches, predicting the total amount of data which will be received through the data stream also avoids situations in which the selected blocks have a combined storage capacity which is undesirably (e.g., significantly) higher than a total amount of data received in the data stream. However, it should be noted that it may be preferred to select a number of blocks such that the combined storage capacity is greater than the total amount of data predicted to be received through the data stream. In other words, the number of blocks selected to stripe the received data across is greater than a number of blocks which would be used ("needed") to store the data in a conventional sequential manner, e.g., as will be described in further detail below. Selecting a number of blocks which have a combined storage capacity that is greater than a predicted total amount of data received is also desirable in some approaches in order to account for any inaccuracies in the prediction made. Moreover, a manageable amount of storage space which goes unused in approaches for which the total amount of data is overpredicted is more desirable than situations in which the total amount of data is underpredicted and the selected blocks are unable to store all of the data received. Although additional blocks may be recruited in such situations, this undesirably introduces latency to the process of storing the received data. The manner in which the data is striped across the selected blocks of storage space in the various approaches included herein (rather than through the selected blocks) also makes it difficult to introduce additional blocks after determining that the combined storage capacity of the blocks already selected is unable to store all of the received data, e.g., as will be described in further detail below.

Data received in a same stream is often accessed at about the same time. For example, data received in a same stream may correspond to a same application, a same document, operations performed on a same file, etc. and therefore has an increased probability of being accessed (e.g., read) at about a same time. Accordingly, the blocks of memory are further selected in operation 504 such that no two or more of the selected blocks of memory have an effect on the read apparent voltage of a same one of the plurality of blocks in the memory. In other words, each of the blocks of memory selected in operation 504 act as an "aggressor" to a different "victim" block. As mentioned above, the inventors have discovered that certain blocks in memory are "related" in that they have an aggressor-victim relationship with each other regarding read array operations. More specifically, the process of reading data from a page in a given block can directly affect the read apparent voltage of one or more other pages in one or more other blocks of memory. Thus, by selecting blocks of memory in operation 504 such that no two or more of them affect the read apparent voltage of a same "victim" block, the RBER resulting from future data access operations is effectively reduced. By reducing the RBER, the processes of method 500 are also able to lower data access times, reduce system latency, increase data retention, etc.

Although it is not fully understood why the aggressor-victim relationship exists between the pages in different blocks, the aggressor-victim relationship can be identified a number of different ways, e.g., depending on the desired approach. For instance, in some approaches the various blocks in memory can be tested during (e.g., as a part of) the manufacturing phase. In other approaches, the various blocks in memory can be tested by an administrator upon being implemented in a storage system, e.g., as a part of an installation.

Moreover, the process of actually testing the various blocks in memory varies as well depending on the approach. For instance, the blocks in a given memory are tested for aggressor-victim relationships which exist therebetween in some approaches by performing one or more mock read operations on each of the blocks and measuring whether each of the mock read operations have an effect on the read apparent voltage of any other blocks in the memory. In other approaches, the blocks in a given memory are tested for aggressor-victim relationships existing therebetween during actual use, e.g., in order to reduce resource consumption and/or manufacturing times. Accordingly, a memory management module (e.g., central controller) can fun an application in the background which determines whether each (or at least some) of the read operations performed in memory have an effect on the read apparent voltage of any other one or more of the blocks therein. It follows that an understanding of the aggressor-victim relationship for the blocks in a given memory can be updated over time and with actual use. Further still, two or more blocks in memory determined as having an aggressor-victim relationship therebetween may be added to a lookup table, flagged, reported to a storage system administrator, identified as such in a logical-to-physical table, etc.

Referring still to FIG. 5A, operation 506 includes writing the data across the selected blocks of memory in parallel. In other words, rather than filling each of the pages in a given block with data before proceeding to fill each of the pages in a subsequent block, operation 506 includes writing data to a first page in each of the selected blocks and proceeding to fill a second page in each of the selected blocks once the first page of each block has been filled. It follows that the data is used to fill a page-stripe which extends across each of the selected blocks before progressing to a next page-stripe. It should also be noted that, with respect to the present description, "first" and "second" are in no way intended to be limited to the first numbered and second numbered pages (e.g., Page 0 and Page 1) in each of the selected blocks. Rather, any of the pages in the selected blocks may be considered the first or second page.

Figure 6:
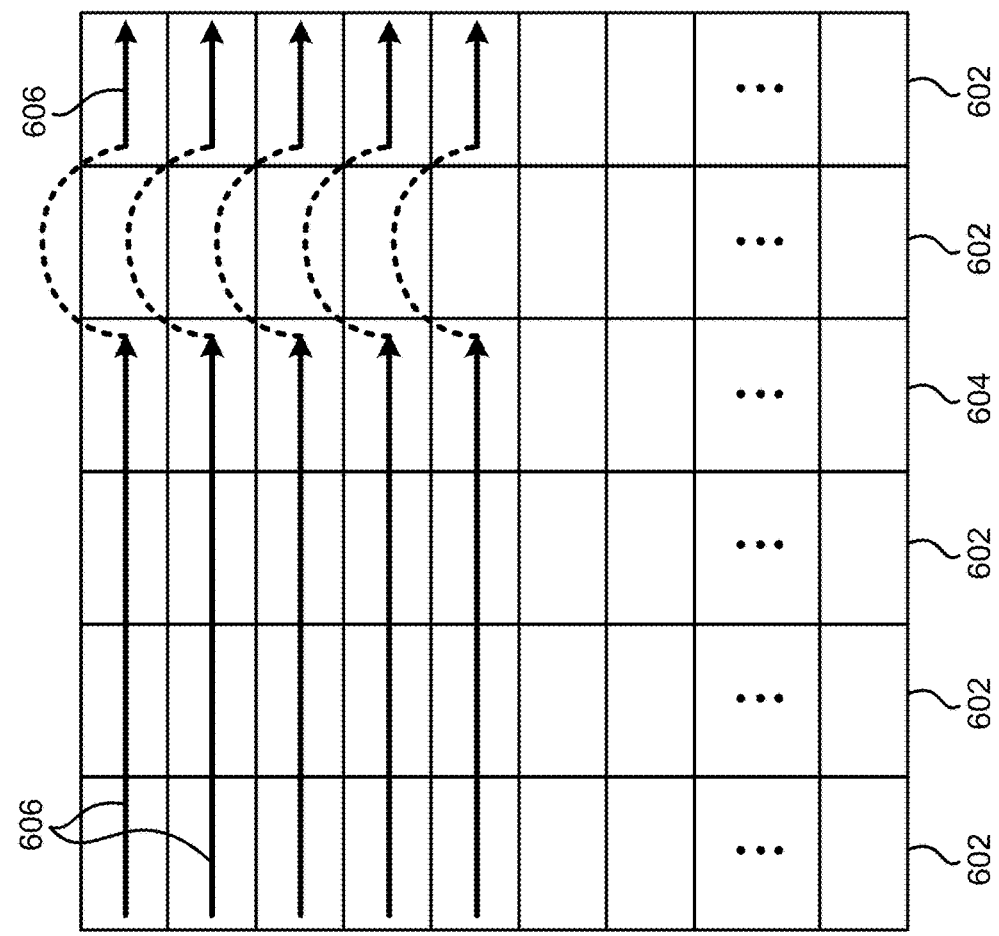
FIG. 6 is a representational view of the process of writing data across blocks of storage space, in accordance with one embodiment.

Writing data across the selected blocks of memory in parallel further reduces the read aggression experienced by a factor of greater than one, as each subsequent portion of data is stored in a page which is located in a different one of the selected blocks (e.g., see FIG. 6 below). Accordingly, when data is read from memory, the amount of times and/or frequency by which the page of a given block is read is reduced by a factor which directly correlates to the number of blocks selected in operation 504 above. Again, this further reduces the effect that the aggressor-victim block relationships have on performance of the memory itself and improves performance, e.g. as would be appreciated by one skilled in the art after reading the present description.

Figure 5B:
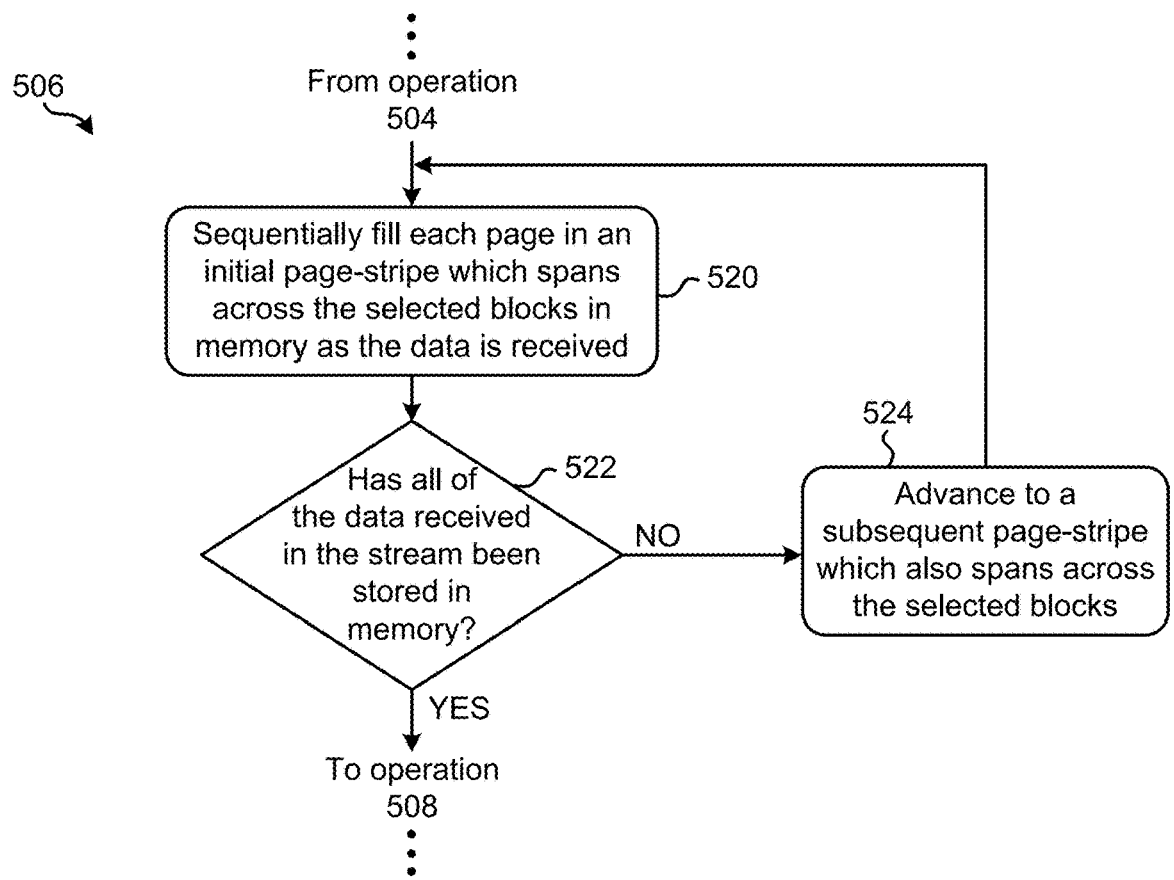
FIG. 5B is a flowchart of sub-processes for one of the operations in the method of FIG. 5A, in accordance with one embodiment.

However, the process of actually writing the data across the selected blocks of memory in parallel is also performed differently depending on the particular approach. For example, in some approaches the data is written to the selected blocks in memory as it is received. In other words, a number of blocks in memory are selected (e.g., based on the flow rate of the stream of data) and sequentially written to as data is received in the stream. Referring momentarily to FIG. 5B, exemplary sub-processes of writing the data across the selected blocks of memory in parallel are illustrated in accordance with one embodiment, one or more of which may be used to perform operation 506 of FIG. 5A. However, it should be noted that the sub-processes of FIG. 5B are illustrated in accordance with one embodiment which is in no way intended to limit the invention.

As shown, sub-operation 520 includes sequentially filling each page in an initial page-stripe which spans across the selected blocks in memory as the data is received. Thus, as data is received in the stream, it is used to sequentially fill a page in each of the selected blocks. This approach is beneficial in that it does not involve the extensive use of a buffer as the data is stored in memory as it is received. Although a minimal buffer may be used in some approaches, e.g., to facilitate partitioning and/or staging of the data such that it fits in each of the pages being written to, sub-operation 520 reduces an amount of system resources which are consumed in order to store the data received. It should also be noted that although the "initial page-stripe" corresponds to page-stripe 0 in some approaches, sub-operation 520 may include filling each page of any desired page-stripe extending across the selected blocks. For example, page-stripe 3 may serve as the "initial page-stripe" in some approaches.

Upon filling a last page in the page stripe, the flowchart of FIG. 5B proceeds to decision 522 which includes determining whether all of the data received in the stream has been stored in memory. However, because the present approach involves storing data as it is received, decision 522 may also include determining whether a predetermined amount of time has passed since a last portion of data was received in the stream, whether an indication has been received that the stream ended, an anticipated amount of data has been stored in memory, etc. Moreover, although decision 522 is shown in the present approach as being performed after operation 520 has been performed, the one or more determinations made in decision 522 may be performed in the background a recursive fashion in some approaches.

In response to determining that at least some of the data received in the stream has yet to be stored in memory, the flowchart proceeds to sub-operation 524. There, sub-operation 524 includes advancing to a subsequent page-stripe which also spans across the selected blocks. Thereafter, the flowchart returns to sub-operation 520 such that the data received is used to sequentially fill each page in the subsequent page-stripe spanning across the selected blocks in memory as well. However, returning to decision 522, the flowchart proceeds to operation 508 in response to determining that all of the data received in the stream has been stored in memory.

While the processes included in FIG. 5B are desirable as they minimize internal buffer use by writing data to memory as the data is received, it also involves holding each of the selected blocks open (e.g., in a partially programmed state) until data is written thereto. However, in some situations blocks which remain in an open state do not have uniform retention and/or read disturb characteristics across the various pages therein. More specifically, pages which are programmed first will have more retention characteristics than those pages which are programmed later. Moreover, read operations performed on the programmed pages will disturb the erase state of the pages which have not yet been programmed, potentially leading to read errors.

Figure 5C:
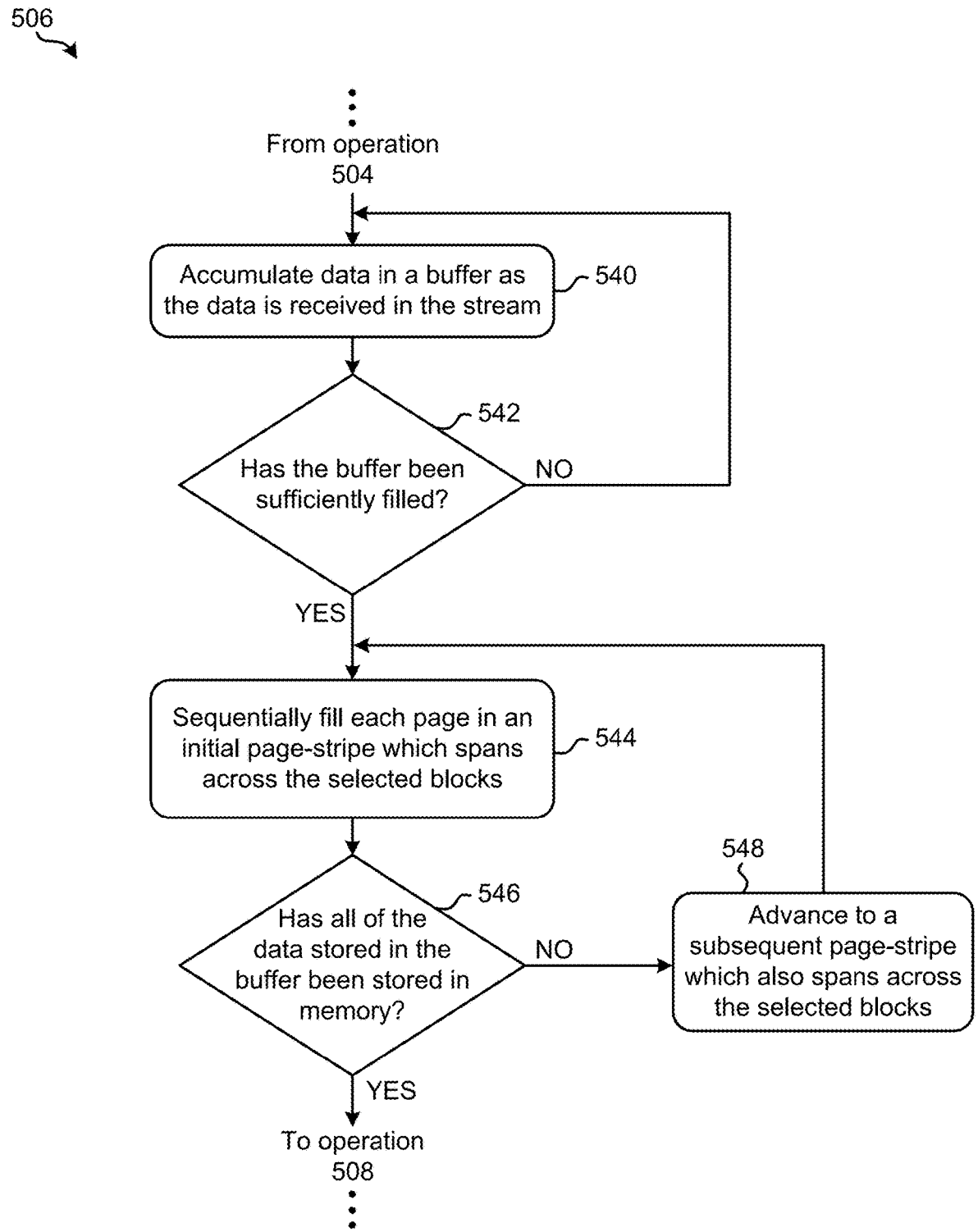
FIG. 5C is a flowchart of sub-processes for one of the operations in the method of FIG. 5A, in accordance with one embodiment

Alternatively, FIG. 5C illustrates exemplary sub-processes of writing the data across the selected blocks of memory in parallel in accordance with another embodiment, one or more of which may be used to perform operation 506 of FIG. 5A. However, it should be noted that the sub-processes of FIG. 5C are illustrated in accordance with one embodiment which is in no way intended to limit the invention.

As shown, sub-operation 540 includes accumulating data in a buffer as the data is received in the stream. The buffer preferably has a storage capacity which is greater than or equal to a combined storage capacity of the selected blocks such that the buffer is able to store all of the data before it is actually written to the blocks in memory.

Decision 542 further includes determining whether the buffer has been sufficiently filled. In other words, decision 542 includes determining whether an amount of data which has accumulated in the buffer meets an anticipated throughput of the data stream. The total amount of data which will be received from a given data stream can be anticipated (e.g., deduced) by evaluating the rate at which data is received in a given amount of time, the consistency of the rate at which the data is received, etc., or any other processes which would be apparent to one skilled in the art after reading the present description. Accordingly, decision 542 is based on whether the amount of data which has accumulated in the buffer matches (or is sufficiently close to) an amount of data the data stream is anticipated to deliver.

In response to determining that the buffer has not been sufficiently filled (e.g., that additional data has yet to be received and stored in the buffer), the flowchart returns to sub-operation 540 such that additional data can be accumulated in the buffer. However, the flowchart proceeds to sub-operation 544 in response to determining that the buffer has been sufficiently filled. There, sub-operation 544 includes sequentially filling each page in an initial page-stripe which spans across the selected blocks. Accordingly, performing sub-operation 544 may include any one or more of the approaches described above with respect to performing sub-operation 520 in FIG. 5B.

Upon filling a last page in the page stripe, the flowchart of FIG. 5C proceeds to decision 546 which includes determining whether all of the data stored in the buffer has been stored in memory. As mentioned above, although decision 546 is shown in the present approach as being performed after operation 544 has been performed, the one or more determinations made in decision 546 may be performed in the background a recursive fashion in some approaches.

In response to determining that at least some data remains in the buffer, the flowchart proceeds to sub-operation 548. There, sub-operation 548 includes advancing to a subsequent page-stripe which also spans across the selected blocks. Thereafter, the flowchart returns to sub-operation 544 such that the remaining data in the buffer is used to sequentially fill each page in the subsequent page-stripe spanning across the selected blocks in memory as well. However, returning to decision 546, the flowchart proceeds to operation 508 in response to determining that all of the data received in the stream has been stored in memory.

While the processes included in FIG. 5C are desirable as they minimize an amount of time that the selected blocks remain in an open state, thereby further reducing a resulting RBER, a sufficiently large buffer is used to store the data as it is received in the data stream before actually being written to memory. It follows that the benefits and side effects associated with the different ways of writing the data across the selected blocks of memory in parallel as presented in FIG. 5B and FIG. 5C can be balanced to select a process which is best suited for the given situation.

As mentioned above, the blocks used to store received data are selected based on the aggressor-victim relationships which exist between the various blocks in memory. Thus, in some approaches the blocks which are selected are at least somewhat distributed in that each of the selected blocks of memory will likely not be located in directly adjacent channels of the memory. Referring momentarily to FIG. 6, the process of writing data across the selected blocks of memory is illustrated in accordance with an in-use example, which is in no way intended to limit the invention.

As shown, some of the blocks included in a portion of memory 600 are selected to store data received in a data stream. More specifically, blocks 602 have been selected (e.g., according to any of the processes included in method 500 above), while block 604 has not. When writing data across the selected blocks, the data is preferably written to each page of a page stripe which extends across each of the selected blocks 602, e.g., as described above. The arrows 606 in FIG. 6 illustrate the progression of writing to each of the pages, beginning at a leftmost page in an upper-most page stripe and sequentially advancing to the rightmost page in the upper-most page stripe.

However, the page-stripes which span across the selected blocks 602 of memory also span across blocks 604 which were not selected, and thereby include at least one page of a block which is not selected. Although a page in the block 604 which was not selected is positioned in this page stripe, the writing progression preferably skips over this page, e.g., as shown. Thus, the process of actually writing to the selected blocks will typically involve skipping over certain blocks such that they are not used to store the data therein. As mentioned above, this desirably avoids situations where data is written to blocks, two or more of which have pages act as aggressors to the pages in a same victim block.

According to another in-use example, which is in no way intended to limit the invention, data received from a data stream is written in Mb blocks by filling each of the page stripes therein in parallel. Here, "Mb" represents the number of blocks selected to store the data. Moreover, each block will have Np/a pages therein filled with a respective portion of the data. Each block will also experience NrNp/a page reads, where a=Mb/Nb>1.

As described above, data is written to the Mb blocks in a page-by-page manner as soon as the data is available in the controller. Accordingly, the Mb blocks are filled in parallel page-by-page. In some approaches, data is first written to an internal buffer which has a size (e.g., storage capacity) greater than or equal to that of the Mb blocks. Once the buffer has been sufficiently filled (e.g., another task to write new data is received), the accumulated data is written across the pages of the Mb selected blocks sequentially at once. The approaches included in this in-use example correspond to a system architecture where sequential system addresses are striped across blocks, thereby reducing the amount of read aggression experienced by a factor of a>1.

According to the aggressor-victim block relationship each victim block has a total of "K" aggressor blocks. This relationship between the blocks in memory is preferably available to a management controller which actually selects the blocks which are used to store the data as described in the various approaches herein. Moreover, information pertaining to (e.g., describing) the aggressor-victim block relationships may be provided by the memory vendor, may be determined by characterization of the memory, may be learned by background operations in real-time, etc. depending on the approach. These aggressor-victim block relationships are then used to select blocks to store received data in a way that minimizes the effect of read aggression. More specifically, the selected blocks should not include aggressor blocks that affect the same victim block, e.g., as described above, thereby limiting the read disturbance any victim block experiences to a single read aggressor.

Given read aggressor/victim block relationships, the approaches included herein are able to select blocks used to store data as well as distribute the data across the selected blocks in a way that reduces the effect of read disturbance between aggressor and victim blocks. Moreover, the approaches included herein are applicable and effective for any storage mechanisms (e.g., device, technology, circuit specifics, etc.) which experience read aggressor/victim block relationships.

It follows that various ones of the embodiments included herein are able to apply the knowledge of the aggressor-victim relationship which exists between blocks and/or pages of memory in order to architect a storage system which stripes sequential system addresses across blocks of memory rather than through them. In doing so, when a given workload reads a set of sequential addresses in a tight loop, the effects caused by the aggressor-victim relationships are spread evenly across a larger number of unique blocks and/or planes in a die and/or plane group. This is particularly desirable, as some of the embodiments included herein are able to produce a storage architecture which significantly reduces the number of read array operations performed on a single block in memory to support a series of sequential read operations. As such, data retention is increased, latency is reduced, system efficiency is improved, etc., as would be appreciated by one skilled in the art after reading the present description.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Figure 7:
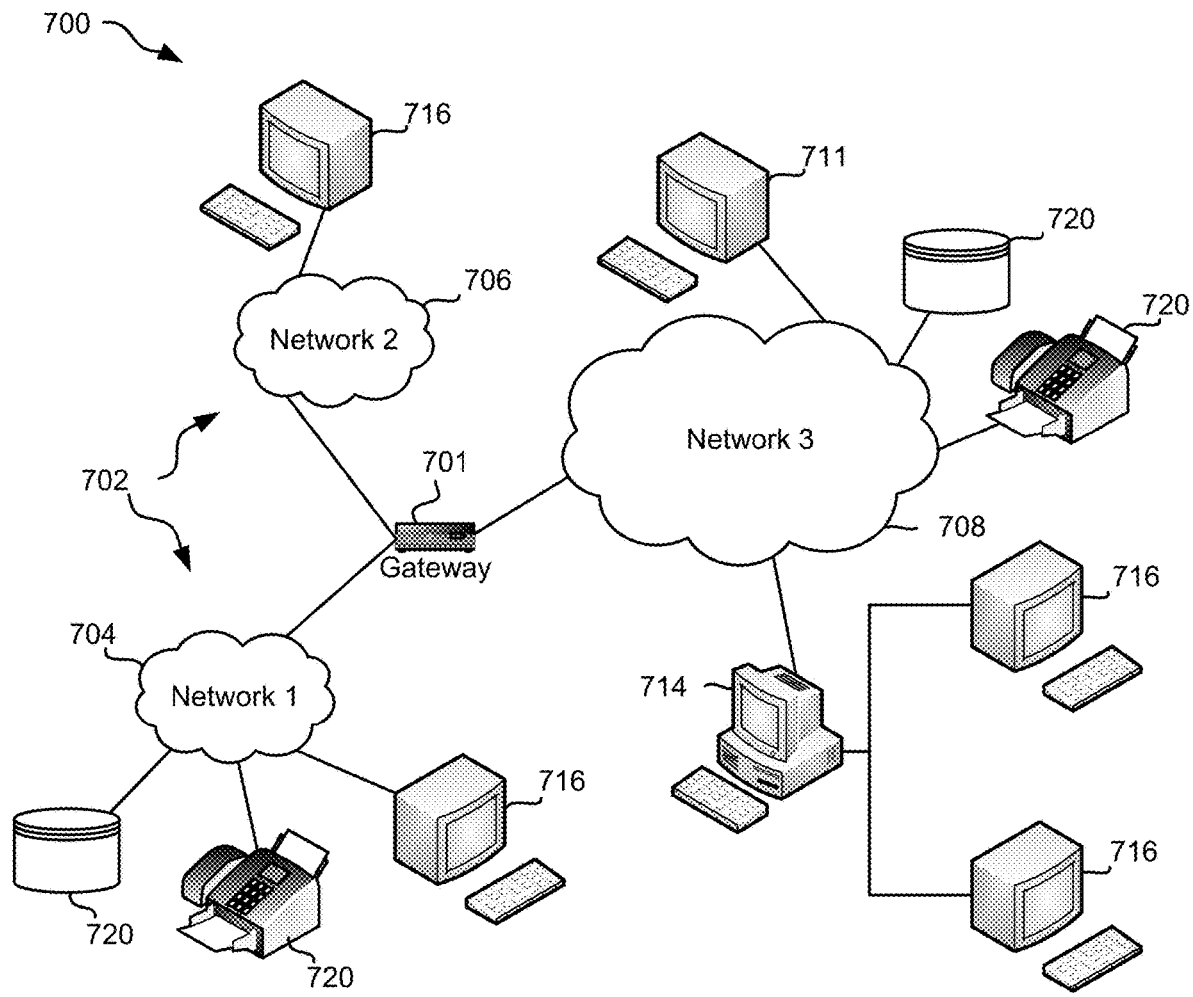
FIG. 7 is a network architecture, in accordance with one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, public switched telephone network (PSTN), internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, handheld computer, printer, and/or any other type of logic-containing device. It should be noted that a user device 711 may also be directly coupled to any of the networks, in some embodiments.

A peripheral 720 or series of peripherals 720, e.g., facsimile machines, printers, scanners, hard disk drives, networked and/or local data storage units or systems, etc., may be coupled to one or more of the networks 704, 706, 708. It should be noted that databases and/or additional components may be utilized with, or integrated into, any type of network element coupled to the networks 704, 706, 708. In the context of the present description, a network element may refer to any component of a network.

According to some embodiments, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In other embodiments, one or more networks 704, 706, 708, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 8:
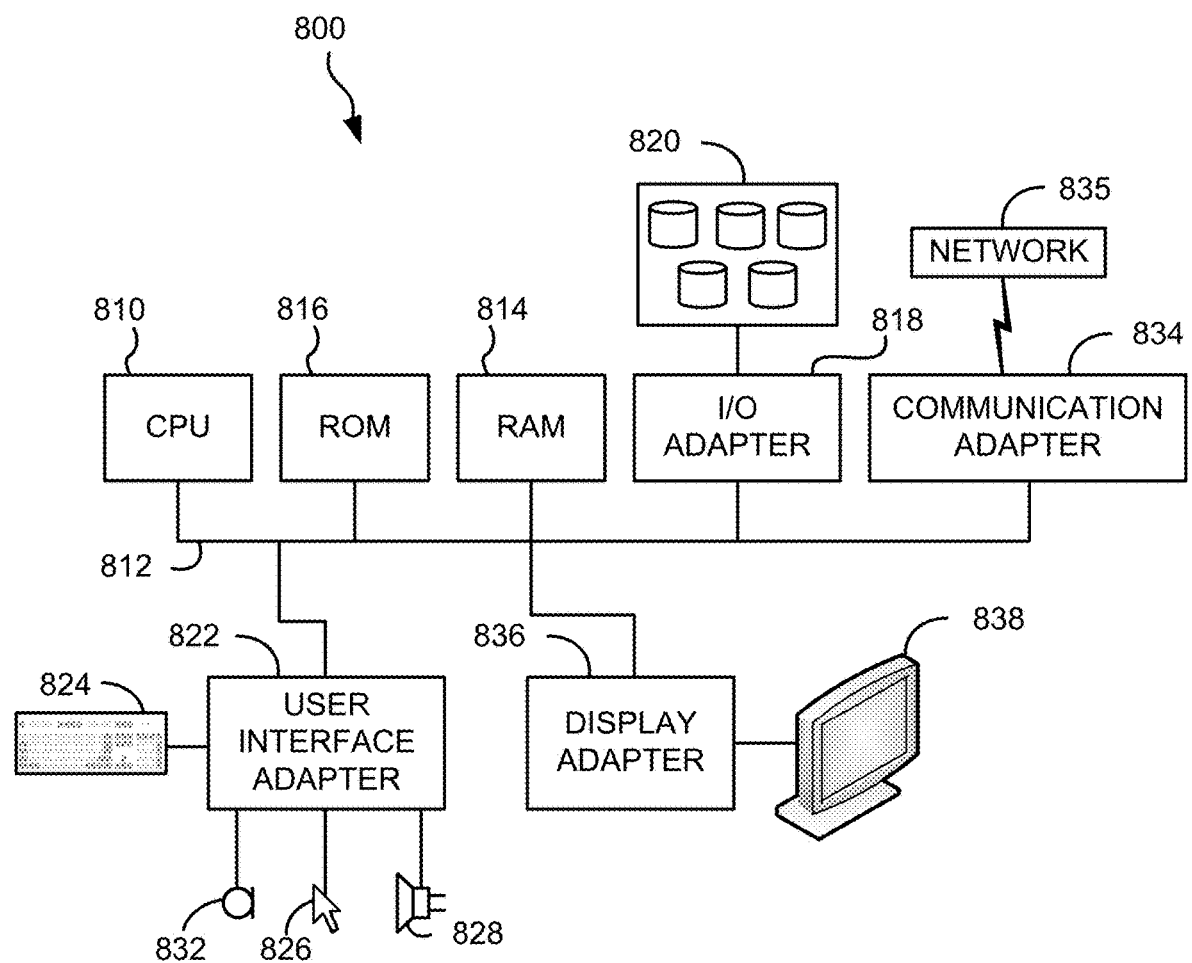
FIG. 8 is a representative hardware environment that may be associated with the servers and/or clients of FIG. 7, in accordance with one embodiment.

FIG. 8 shows a representative hardware environment associated with a user device 716 and/or server 714 of FIG. 7, in accordance with one embodiment. FIG. 8 illustrates a typical hardware configuration of a processor system 800 having a central processing unit 810, such as a microprocessor, and a number of other units interconnected via a system bus 812, according to one embodiment. In some embodiments, central processing unit 810 may include any of the approaches described above with reference to the one or more processors 210 of FIG. 2.

The processor system 800 shown in FIG. 8 includes a Random Access Memory (RAM) 814, Read Only Memory (ROM) 816, and an I/O adapter 818. According to some embodiments, which are in no way intended to limit the invention, I/O adapter 818 may include any of the approaches described above with reference to I/O adapter 218 of FIG. 2. Referring still to processor system 800 of FIG. 8, the aforementioned components 814, 816, 818 may be used for connecting peripheral devices such as storage subsystem 820 to the bus 812. In some embodiments, storage subsystem 820 may include a similar and/or the same configuration as data storage system 220 of FIG. 2. According to an example, which is in no way intended to limit the invention, storage subsystem 820 may include non-volatile data storage cards, e.g., having NVRAM memory cards, RAM, ROM, and/or some other known type of non-volatile memory, in addition to RAID controllers as illustrated in FIG. 2.

With continued reference to FIG. 8, a user interface adapter 822 for connecting a keyboard 824, a mouse 826, a speaker 828, a microphone 832, and/or other user interface devices such as a touch screen, a digital camera (not shown), etc., to the bus 812.

Processor system 800 further includes a communication adapter 834 which connects the processor system 800 to a communication network 835 (e.g., a data processing network) and a display adapter 836 which connects the bus 812 to a display device 838.

The processor system 800 may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 9:
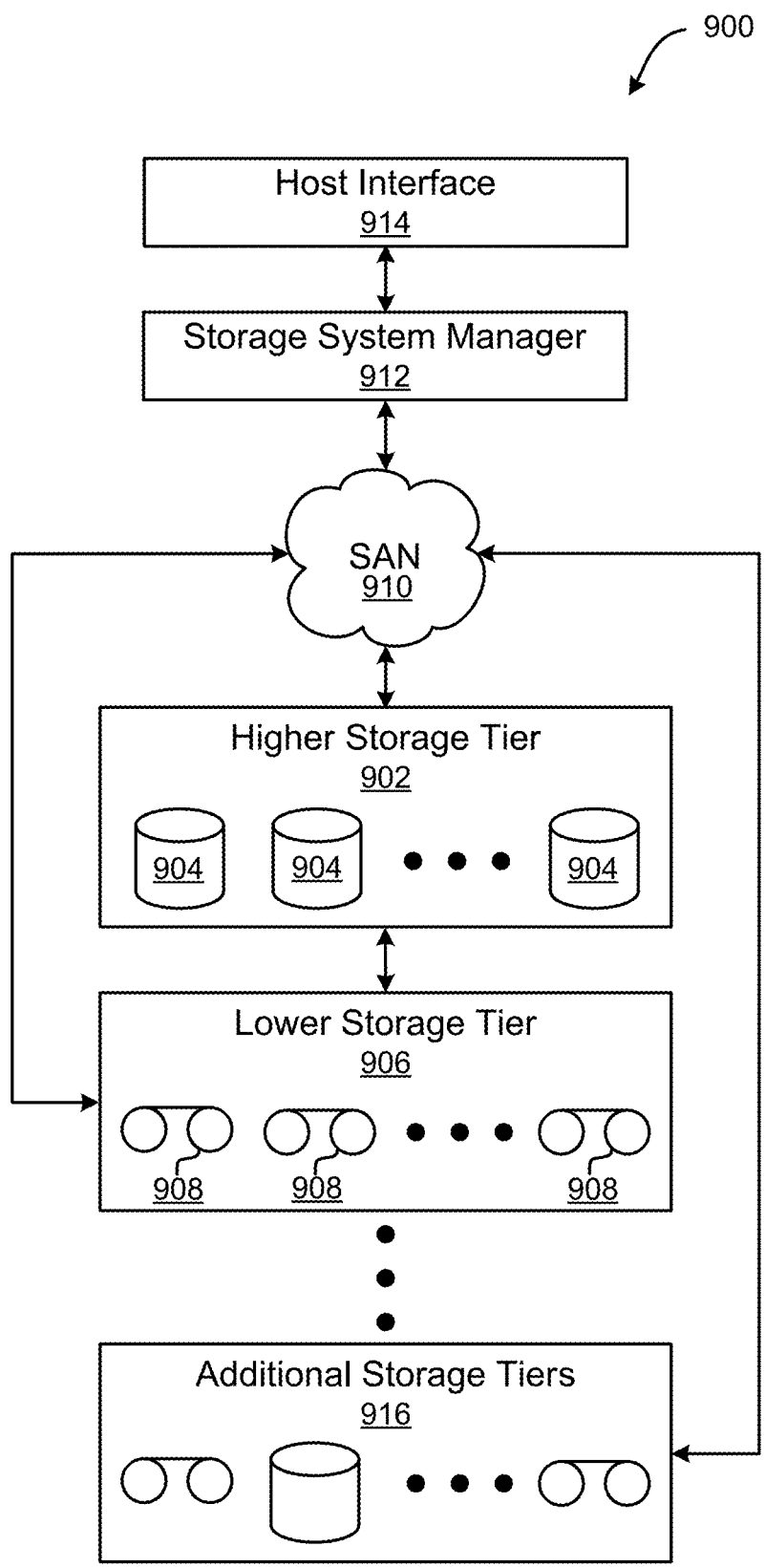
FIG. 9 is a tiered data storage system in accordance with one embodiment.

Moreover, FIG. 9 illustrates a storage system 900 which implements high level (e.g., SSD) storage tiers in combination with lower level (e.g., magnetic tape) storage tiers, according to one embodiment. Note that some of the elements shown in FIG. 9 may be implemented as hardware and/or software, according to various embodiments. The storage system 900 may include a storage system manager 912 for communicating with a plurality of media on at least one higher storage tier 902 and at least one lower storage tier 906. However, in other approaches, a storage system manager 912 may communicate with a plurality of media on at least one higher storage tier 902, but no lower storage tier. The higher storage tier(s) 902 preferably may include one or more random access and/or direct access media 904, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 902 depending on the desired embodiment.

Referring still to FIG. 9, the lower storage tier(s) 906 preferably includes one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Thus, the one or more additional storage tiers 916 may, in some approaches, include a SSD system architecture similar or the same as those illustrated in FIGS. 1-2. Also, any of the higher storage tiers 902 and/or the lower storage tiers 906 may include any combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions.

Of course, this logic may be implemented as a method on any device and/or system or as a computer program product, according to various embodiments.

What is claimed is:

1. A computer-implemented method, comprising:
receiving a stream of data;
selecting more than one block of memory to write the stream of data to, wherein the selected blocks of memory are in a memory that includes a plurality of blocks; and
writing the data across the selected blocks of memory in parallel,
wherein each of the blocks of memory are tested to determine which specific ones of the plurality of blocks in the memory act as victim blocks to a same aggressor block, wherein an aggressor block has an effect on a read apparent voltage of a corresponding victim block,
wherein the blocks of memory are selected using results of the testing such that no two or more of the selected blocks of memory have an effect on the read apparent voltage of a same one of the plurality of blocks in the memory.

2. The computer-implemented method of claim 1, wherein writing the data across the selected blocks of memory in parallel includes:
sequentially filling each page in an initial page-stripe which spans across the selected blocks as the data is received; and
performing an iterative process which includes:
advancing to a subsequent page-stripe spanning across the selected blocks, and
sequentially filling each page in the subsequent page-stripe as the data is received.

3. The computer-implemented method of claim 1, wherein writing the data across the selected blocks of memory in parallel includes:
accumulating the data in a buffer as the data is received;
in response to determining that the buffer has been sufficiently filled, sequentially filling each page in an initial page-stripe which spans across the selected blocks; and
performing an iterative process which includes:
advancing to a subsequent page-stripe spanning across the selected blocks, and
sequentially filling each page in the subsequent page-stripe.

4. The computer-implemented method of claim 1, wherein a page-stripe which spans across the selected blocks of memory includes at least one page of a block which is not selected, wherein the at least one block is not used to store the data.

5. The computer-implemented method of claim 1, wherein a number of blocks of memory selected is based on an amount of data included in the stream of data.

6. The computer-implemented method of claim 5, wherein a storage capacity of the blocks of memory selected is greater than an amount of data received.

7. The computer-implemented method of claim 1, wherein the memory is non-volatile memory, wherein the memory is NAND Flash memory, wherein the testing is performed on the blocks of memory by conducting mock read operations on the blocks during a process of manufacturing the memory.

8. The computer-implemented method of claim 3, wherein sequentially filling each page in the initial page-stripe includes:
writing data to a first page in each of the selected blocks, wherein the first pages are in the initial page-stripe; and
performing a second iterative process which includes:
advancing to a subsequent page in each of the selected blocks, wherein the subsequent pages are in a subsequent page-stripe,
writing data to the subsequent page in each of the selected blocks, and
determining whether the subsequent page-stripe has been filled.

9. A computer program product comprising a computer readable storage medium having program instructions embodied therewith, wherein the computer readable storage medium is not a transitory signal per se, the program instructions readable and/or executable by a processor to cause the processor to perform a method comprising:
receiving, by the processor, a stream of data;
selecting, by the processor, more than one block of memory to write the stream of data to, wherein the selected blocks of memory are in a memory that includes a plurality of blocks; and
writing, by the processor, the data across the selected blocks of memory in parallel,
wherein each of the blocks of memory are tested during a process of manufacturing the memory to determine which specific ones of the plurality of blocks in the memory act as victim blocks to a same aggressor block, wherein an aggressor block has an effect on a read apparent voltage of a corresponding one or more victim blocks,
wherein the blocks of memory are selected using results of the testing such that no two or more of the selected blocks of memory have an effect on the read apparent voltage of a same one of the plurality of blocks in the memory.

10. The computer program product of claim 9, wherein writing the data across the selected blocks of memory in parallel includes:
sequentially filling each page in an initial page-stripe which spans across the selected blocks as the data is received; and
performing an iterative process which includes:
advancing to a subsequent page-stripe spanning across the selected blocks, and
sequentially filling each page in the subsequent page-stripe as the data is received.

11. The computer program product of claim 9, wherein writing the data across the selected blocks of memory in parallel includes:
accumulating the data in a buffer as the data is received;
in response to determining that the buffer has been sufficiently filled, sequentially filling each page in an initial page-stripe which spans across the selected blocks; and performing an iterative process which includes:
advancing to a subsequent page-stripe spanning across the selected blocks, and
sequentially filling each page in the subsequent page-stripe.

12. The computer program product of claim 9, wherein a page-stripe which spans across the selected blocks of memory includes at least one page of a block which is not selected, wherein the at least one block is not used to store the data.

13. The computer program product of claim 9, wherein a number of blocks of memory selected is based on an amount of data included in the stream of data, wherein a storage capacity of the blocks of memory selected is greater than an amount of data received.

14. The computer program product of claim 11, wherein sequentially filling each page in the initial page-stripe includes:
writing data to a first page in each of the selected blocks, wherein the first pages are in the initial page-stripe.

15. The computer program product of claim 9, wherein the memory is non-volatile memory, wherein the memory is NAND Flash memory.

16. The computer program product of claim 14, wherein the program instructions are readable and/or executable by the processor to cause the processor to perform the method comprising:
performing, by the processor, a second iterative process which includes:
advancing to a subsequent page in each of the selected blocks, wherein the subsequent pages are in a subsequent page-stripe,
writing data to the subsequent page in each of the selected blocks, and
determining whether the subsequent page-stripe has been filled.

17. A system, comprising:
a plurality of non-volatile random access memory blocks configured to store data;
a processor; and
logic integrated with and/or executable by the processor, the logic being configured to:
receive, by the processor, a stream of data;
select, by the processor, more than one block of memory to write the stream of data to, wherein the selected blocks of memory are in a memory that includes a plurality of blocks; and
write, by the processor, the data across the selected blocks of memory in parallel,
wherein each of the blocks of memory are tested in response to the memory being implemented in a storage system, wherein the testing determines which specific ones of the plurality of blocks in the memory act as victim blocks to a same aggressor block,
wherein an aggressor block has an effect on a read apparent voltage of a corresponding one or more victim blocks,
wherein the blocks of memory are selected using results of the testing such that no two or more of the selected blocks of memory have an effect on the read apparent voltage of a same one of the plurality of blocks in the memory.

18. The system of claim 17, wherein writing the data across the selected blocks of memory in parallel includes:
sequentially filling each page in an initial page-stripe which spans across the selected blocks as the data is received; and
performing an iterative process which includes:
advancing to a subsequent page-stripe spanning across the selected blocks, and
sequentially filling each page in the subsequent page-stripe as the data is received.

19. The system of claim 17, wherein writing the data across the selected blocks of memory in parallel includes:
accumulating the data in a buffer as the data is received;
in response to determining that the buffer has been sufficiently filled, sequentially filling each page in an initial page-stripe which spans across the selected blocks; and
performing an iterative process which includes:
advancing to a subsequent page-stripe spanning across the selected blocks, and
sequentially filling each page in the subsequent page-stripe.

20. The system of claim 17, wherein a page-stripe which spans across the selected blocks of memory includes at least one page of a block which is not selected, wherein the at least one block is not used to store the data, wherein the memory is triple level cell NAND Flash memory, wherein each of the blocks of memory are tested during actual use of the memory in the storage system.

* * * * *